United States Patent
Boulton

(10) Patent No.: US 10,732,640 B2
(45) Date of Patent: Aug. 4, 2020

(54) SYSTEM AND METHOD FOR PREFORMING DIFFERENTIAL ANALYSIS OF VEHICLES

(71) Applicant: BlackBerry Limited, Waterloo (CA)

(72) Inventor: Adam John Boulton, Wirral (GB)

(73) Assignee: BlackBerry Limited, Waterloo, Ontario (CA)

( * ) Notice: Subject to any disclaimer, the term of this patent is extended or adjusted under 35 U.S.C. 154(b) by 32 days.

(21) Appl. No.: 15/953,135

(22) Filed: Apr. 13, 2018

(65) Prior Publication Data
US 2019/0317517 A1 Oct. 17, 2019

(51) Int. Cl.
*G05D 1/02* (2020.01)
*G06K 9/00* (2006.01)
(Continued)

(52) U.S. Cl.
CPC ........... *G05D 1/0246* (2013.01); *B60W 30/09* (2013.01); *B60W 30/0956* (2013.01);
(Continued)

(58) Field of Classification Search
CPC .. G05D 1/0246; G05D 1/0088; G05D 1/0257; G05D 1/0255; G05D 1/024; G05D 2201/0213; G06K 9/6292; G06K 9/00825; G06K 2209/01; G06K 2209/15; G06K 9/00791; B60W 30/18163; B60W 30/09; B60W 30/0956; B60W 2750/308; B60W 2600/00; B60W 2550/306; B60W 2250/10; B60W 2420/54; B60W 2420/52; B60W 2420/42; B60W 2400/00;
(Continued)

(56) References Cited

U.S. PATENT DOCUMENTS 6,081,756 A * 6/2000 Mio ..................... G05D 1/0293
180/168
7,365,769 B1 * 4/2008 Mager ..................... B60Q 1/44
340/467
(Continued)

FOREIGN PATENT DOCUMENTS

EP 1341140 9/2003
EP 1341140 A1 * 9/2003 ............. G08G 1/166
(Continued)

OTHER PUBLICATIONS

Tantalo, John, et al.; "Brake Light Detection by Image Segmentation"; Department of Electrical Engineering and Computer Science; Case Western Reserve University; Cleveland, Ohio; 2006; 4 pages.
(Continued)

*Primary Examiner* — Babar Sarwar
(74) *Attorney, Agent, or Firm* — Conley Rose, P.C.; J. Robert Brown, Jr.

(57) ABSTRACT

An autonomous or semi-autonomous vehicle may improve the overall safety of other vehicles by determining an action of a proximate vehicle based on sensor data and determining one or more expected visual cues associated with the determined action. One or more images of the proximate vehicle may then be used to detect a difference between expected visual cues and the captured images. Detected differences may be used to notify one or more entities that can then take corrective actions.

22 Claims, 5 Drawing Sheets

(51) Int. Cl.
| | |
|---|---|
| *G06T 7/20* | (2017.01) |
| *B60W 30/095* | (2012.01) |
| *B60W 30/09* | (2012.01) |
| *B60W 30/18* | (2012.01) |
| *G05D 1/00* | (2006.01) |
| *G06K 9/62* | (2006.01) |
| *H04L 29/08* | (2006.01) |

(52) U.S. Cl.
CPC ..... *B60W 30/18163* (2013.01); *G05D 1/0088* (2013.01); *G05D 1/024* (2013.01); *G05D 1/0255* (2013.01); *G05D 1/0257* (2013.01); *G06K 9/00825* (2013.01); *G06K 9/6292* (2013.01); *G06T 7/20* (2013.01); *B60W 2400/00* (2013.01); *B60W 2420/42* (2013.01); *B60W 2420/52* (2013.01); *B60W 2420/54* (2013.01); *B60W 2554/00* (2020.02); *B60W 2554/4041* (2020.02); *B60W 2556/00* (2020.02); *B60W 2556/50* (2020.02); *B60W 2754/30* (2020.02); *G05D 2201/0213* (2013.01); *G06K 2209/01* (2013.01); *G06K 2209/15* (2013.01); *G06T 2207/30236* (2013.01); *H04L 67/12* (2013.01)

(58) Field of Classification Search
CPC ..... B60W 2550/402; B60W 2050/007; B60W 2550/10; B60W 30/16; B60W 40/04; G06T 7/20; G06T 2207/30236; H04L 67/12; B60Q 11/005; G08G 1/0175; G08G 1/20
See application file for complete search history.

(56) References Cited

U.S. PATENT DOCUMENTS

| | | | | |
|---|---|---|---|---|
| 7,859,432 B2* | 12/2010 | Kim | ...................... | B60Q 9/008 340/937 |
| 8,781,170 B2* | 7/2014 | Mathieu | ............... | G01C 21/365 382/104 |
| 9,120,484 B1* | 9/2015 | Ferguson | ................ | G01S 17/86 |
| 9,164,511 B1* | 10/2015 | Ferguson | ............. | B60W 30/10 |
| 9,738,125 B1* | 8/2017 | Brickley | .................. | B60D 1/26 |
| 9,812,008 B2* | 11/2017 | Tong | ........................ | G01S 13/87 |
| 10,077,056 B1* | 9/2018 | Fields | ...................... | G06Q 40/08 |
| 2003/0128112 A1* | 7/2003 | Chow | ...................... | B60Q 1/54 340/466 |
| 2003/0167123 A1* | 9/2003 | Nakazawa | ............. | G08G 1/166 701/301 |
| 2007/0168129 A1* | 7/2007 | Thorne | ................... | B60Q 1/525 701/301 |
| 2008/0165028 A1* | 7/2008 | Fechner | ................ | G06K 9/3241 340/901 |
| 2008/0180528 A1* | 7/2008 | Saito | ........................ | H04N 7/18 348/148 |
| 2012/0044066 A1* | 2/2012 | Mauderer | .................. | B60T 7/22 340/479 |
| 2012/0176499 A1* | 7/2012 | Winter | ............... | G06K 9/00825 348/148 |
| 2013/0265414 A1* | 10/2013 | Yoon | ................. | B60W 30/0956 348/118 |
| 2014/0184400 A1* | 7/2014 | Yang | ...................... | G08G 1/166 340/435 |
| 2014/0277942 A1* | 9/2014 | Kyrtsos | ........... | B60W 30/18036 701/41 |
| 2015/0161888 A1* | 6/2015 | Kim | ........................ | G08G 1/052 340/936 |
| 2016/0068156 A1* | 3/2016 | Horii | ...................... | B60W 30/00 701/28 |
| 2016/0349354 A1* | 12/2016 | Yomo | ...................... | G01S 7/023 |
| 2016/0379350 A1* | 12/2016 | Matsui | ...................... | B60Q 1/44 348/125 |
| 2017/0116853 A1* | 4/2017 | Hu | ........................ | G06K 9/00818 |
| 2017/0190286 A1* | 7/2017 | Yavitz | ........................ | B60Q 1/54 |
| 2017/0240109 A1* | 8/2017 | Kimura | ...................... | B60R 1/00 |
| 2017/0263120 A1* | 9/2017 | Durie, Jr. | ................. | G08G 1/205 |
| 2017/0316693 A1* | 11/2017 | Kim | ........................ | G08G 1/0175 |
| 2017/0316694 A1* | 11/2017 | Ryu | ........................ | G08G 1/166 |
| 2017/0330455 A1* | 11/2017 | Kikuchi | ................ | G07C 5/0808 |
| 2018/0144202 A1* | 5/2018 | Moosaei | ................ | G06K 9/6274 |
| 2019/0019414 A1* | 1/2019 | Guan | ........................ | H04N 7/181 |
| 2019/0086914 A1* | 3/2019 | Yen | ........................ | G05D 1/0027 |
| 2019/0176687 A1* | 6/2019 | Nagata | ...................... | B60Q 1/46 |

FOREIGN PATENT DOCUMENTS

| | | | | |
|---|---|---|---|---|
| EP | 3176725 A1 * | 6/2017 | ........ | G06K 9/00825 |
| EP | 3176725 A1 | 6/2017 | | |

OTHER PUBLICATIONS

O'Malley, Ronan, et al.; "Vehicle Detection at Night Based on Tail-Light Detection"; Connaught Automotive Research Group; Department of Electronic Engineering; National University of Ireland, Galway; Jan. 2008; 5 pages.

Extended European Search Report for Europe Application No. 19168910.8 dated Sep. 11, 2019.

* cited by examiner

US 10,732,640 B2

SYSTEM AND METHOD FOR PREFORMING DIFFERENTIAL ANALYSIS OF VEHICLES

TECHNICAL FIELD

The current disclosure relates to detecting possible issues of vehicles on the road using visual characteristics.

BACKGROUND

Vehicles may have different levels of automation associated with their driving mode and type of driving scenarios. The level of automation of a vehicle may be between level 0, indicating that there is zero autonomy and the driver is responsible for performing all driving tasks, and level 5 indicating that the vehicle is fully autonomous and is capable of performing all driving tasks under all conditions without driver input.

Autonomous or semi-autonomous vehicles may improve the safety of roadways by improving driver's reactions, for example with emergency braking, or for fully autonomous vehicles removing the human driver from driving decisions. While autonomous or semi-autonomous vehicles may help improve overall safety of the roadway through improved driving decisions and/or reactions of the autonomous or semi-autonomous vehicles, the overall safety also depends upon all of the vehicles sharing the roadway, regardless of levels of automation, being in good working order.

It is desirable to be able to monitor vehicles on a roadway in order to improve the overall safety of the vehicles travelling on the roadways.

BRIEF DESCRIPTION OF THE DRAWINGS

The present disclosure will be better understood with reference to the drawings, in which.

DETAILED DESCRIPTION

In accordance with an aspect of the present disclosure there is provided a method for vehicle differential analysis at a computing device in a vehicle, the method comprising: obtaining at least one image associated with a proximate vehicle; obtaining sensor data associated with the proximate vehicle; determining a vehicle action of the proximate vehicle from the sensor data; determining an expected visual cue associated with the determined vehicle action; detecting a difference between the expected visual cue and the at least one image associated with the proximate vehicle; and transmitting an indication of the detected difference through a communications interface to a network.

In accordance with an aspect of the present disclosure there is provided a computing device in a vehicle for providing differential analysis, the computing device comprising: a processor; and a communications subsystem, wherein the computing device is configured to: obtain at least one image associated with a proximate vehicle; obtain sensor data associated with the proximate vehicle; determine a vehicle action of the proximate vehicle from the sensor data; determine an expected visual cue associated with the determined vehicle action; detect a difference between the expected visual cue and the at least one image associated with the proximate vehicle; and transmit an indication of the detected difference through a communications subsystem to a network.

Overall safety of roadways may be improved if potential issues of individual vehicles are actively identified and remedied. For example, a vehicle's brake lights provide an important visual indication to other drivers that a vehicle is braking enabling them to react accordingly. A driver of a vehicle may not be aware that the brake lights of their vehicle are not functioning properly and as such may not take corrective actions. Autonomous and semi-autonomous vehicles typically have a range of sensors that can be used to detect the environment around the vehicle, including other vehicles. As described further herein, a vehicle may use differential analysis to detect a difference between an expected visual cue of a proximate vehicle and one or more captured images of the proximate vehicles. The differential analysis may be used to detect potential issues with other vehicles on the roadway and take actions, including for example providing notifications to one or more locations such as a transportation authority, a vehicle owner, etc. As described further below, the differential analysis may determine a proximate vehicles action based on location or range sensor data and then determine an expected visual cue associated with the vehicle action. The expected visual cues can then be compared to captured images in order to detect potential differences between the expected visual cues and the actual visual cues.

Figure 1:
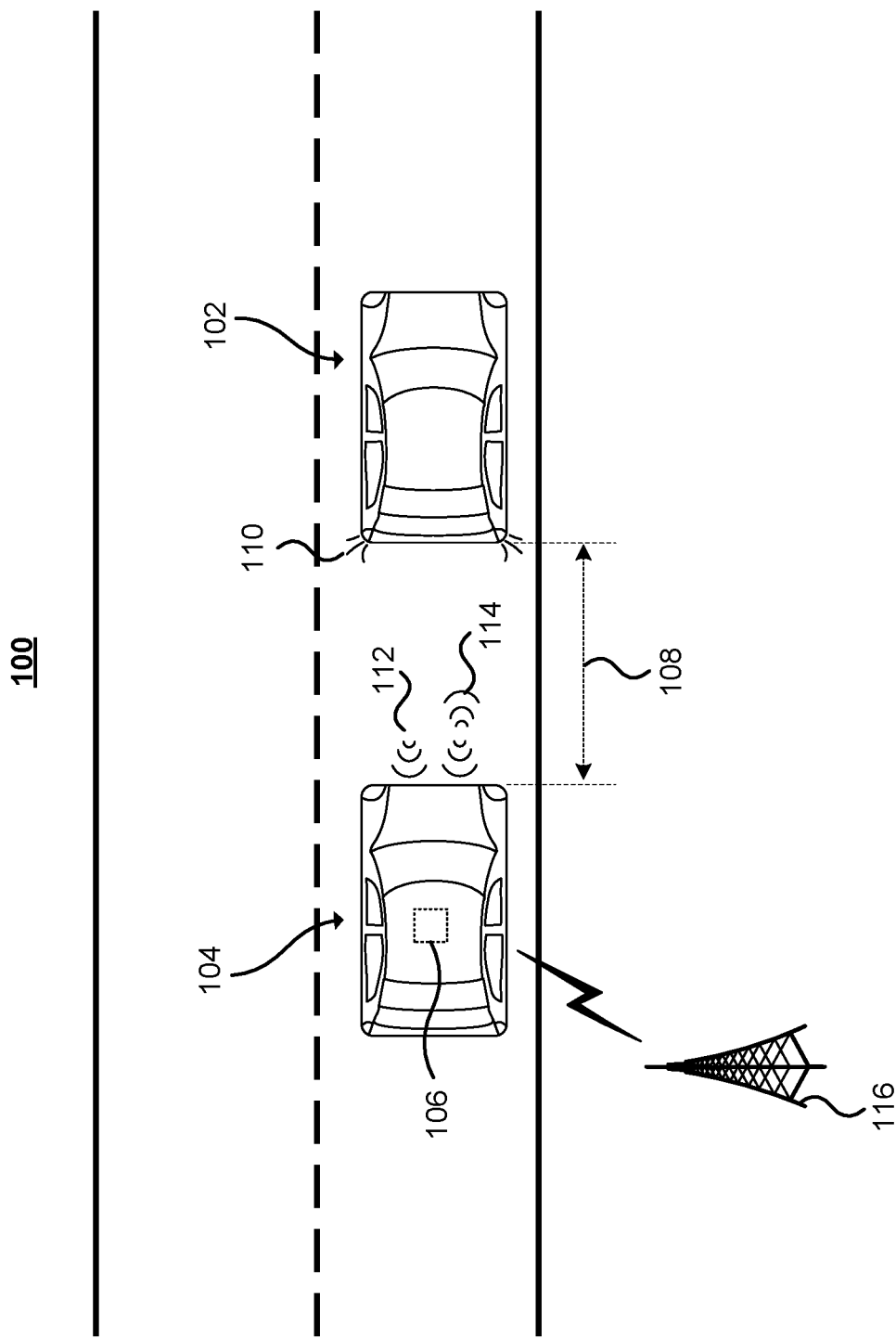
FIG. 1 depicts a roadway environment in which vehicle differential analysis may be performed.

FIG. 1 depicts a roadway environment in which vehicle differential analysis may be performed. As depicted, the roadway environment 100 may include a number of vehicles 102, 104 traveling on a roadway. The roadway may be any type of road or driving surface including, public highways, surface streets, private roads, parking lots, etc. The front vehicle 102 depicted in FIG. 1 is assumed to be an automation level 0 vehicle, while the trailing vehicle 104 is at least an automation level 1 vehicle and includes vehicle hardware 106 comprising a plurality of sensor, such as radar sensors, LIDAR sensors, cameras etc. The vehicle hardware 106 is depicted as being a single component; however, the hardware may be provided as a number of individual components that are communicatively coupled together, for example by a controller area network (CAN) bus.

The front vehicle 102 may perform an action, for example applying the brakes. When the brakes of the front vehicle 102 are applied, whether as a result of the driver depressing the brake pedal or as a result of the autonomous or semi-autonomous vehicle control applying the brakes, rear brake lights will be illuminated as depicted by lines 110 in FIG. 1. The trailing vehicle 104 may capture images, depicted schematically by curved lines 112, of the front vehicle 102, which will show the activated brake lights. Additionally, other sensors may detect a change in the distance between the two vehicles 108, depicted schematically by curved lines 114. When the vehicle 104 detects a braking event from the sensor data, for example the distance 108 changes faster than a braking threshold, one or more expected visual cues can be determined, which in the case of braking would be illuminated brake lights. The captured images may be processed to identify differences between the captured images and expected visual cues. If there is a difference, for example, no illuminated brake lights were detected, an indication of the detected differences may be transmitted from the vehicle 104 to a remote location over a communication network depicted schematically as tower 116. As described further below, with particular reference to FIG. 4, the remote system may further process the received indication of the detected differences and may, for example, provide notifications to one or more locations.

Figure 2:
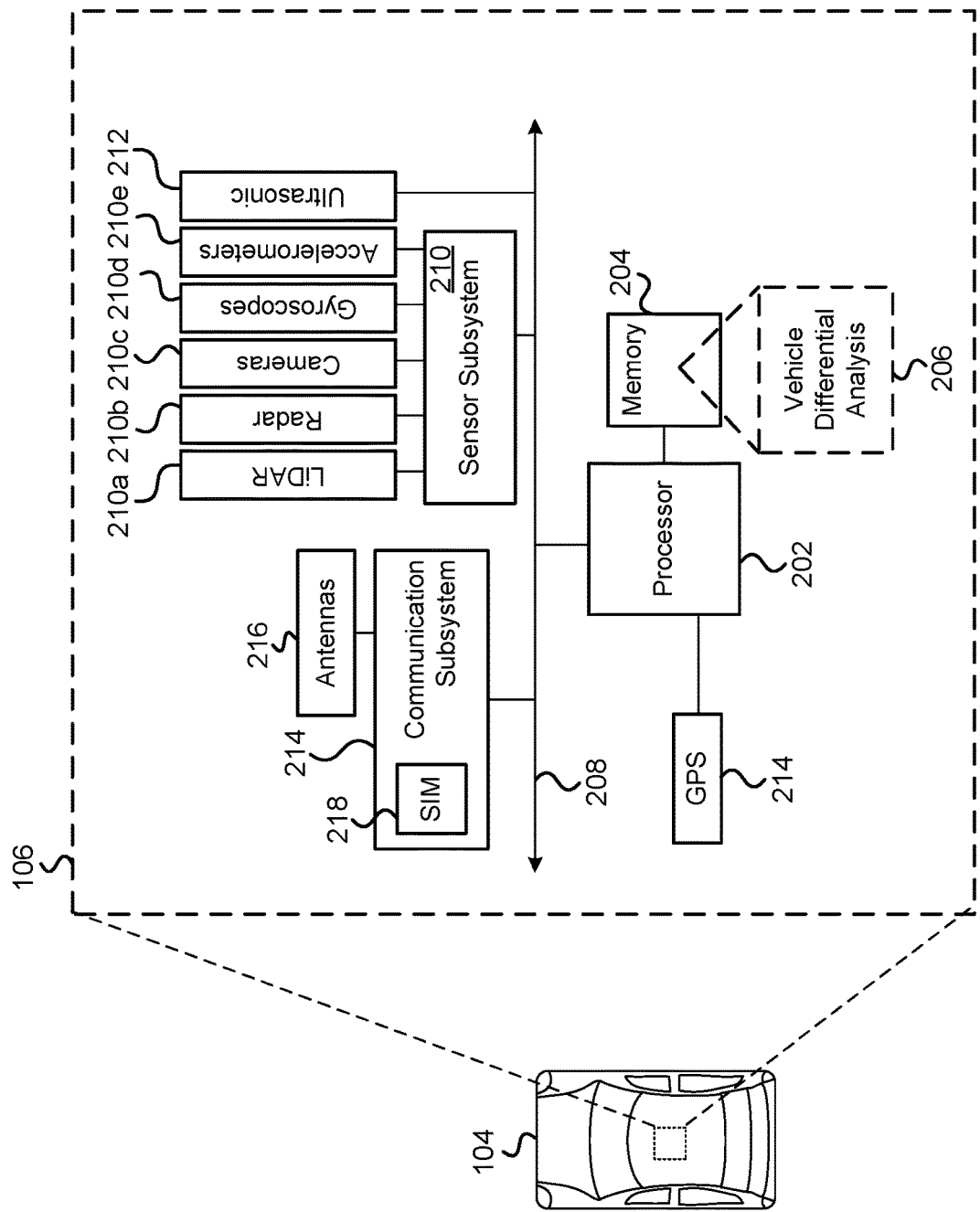
FIG. 2 depicts vehicle components for performing vehicle differential analysis.

FIG. 2 depicts vehicle components for performing vehicle differential analysis. The components depicted in FIG. 2 may provide the hardware components 106 of the vehicle 104 described above with reference to FIG. 1. The components include at least one processor 202 and associated memory unit 204, which although depicted as being separate from the processor may be within, or at least partially within, the processor 202. The memory 204 may include different levels of memory including small and very fast registers or cache memory located within the processor 202, large and fast random access memory (RAM), or other types of memory that provide relatively fast access to stored information, as well as very large and relatively slow non-volatile memory such as solid state drives (SSD) or hard disk drives (HDD). The memory 204 stores data and instructions which when executed by the processor 202 configure the hardware components 106 to provide vehicle differential analysis functionality 206. The vehicle differential analysis functionality 206 can determine a vehicle action and expected visual cues and then compare the expected visual cues to captured images.

The processor 202 may be connected to other components either directly or indirectly. For example, the processor 202 may be communicatively coupled to a bus, such as the vehicle's CAN bus 208. Additional components can be communicatively coupled to the CAN bus 208 including a sensor subsystem 210. The sensor subsystem 210 may be communicatively coupled to one or more sensors 210a, 210b, 210c, 210d, 210e. The sensors may include for example a light detection and ranging (LIDAR) sensor 210a, a radar sensor 210b, one or more cameras 210c, one or more gyroscopes 210d and one or more accelerometers 210e. Although the sensors 210a-210e are described as being connected to bus 208 through the sensor subsystem 210, it is possible for the sensors to be connected directly to the CAN bus 210, which for example is depicted for an ultrasonic sensor 212. Further, as depicted by a GPS sensor 214, it is also possible for one or more sensors to be directly coupled to the processor or coupled to the processor through one or more interface devices.

The hardware components 106 may also include communication components for communicating with external devices and/or systems. The communication components as being provided by a single communication subsystem 214, although a plurality of communication components may provide different types of communication including for example cellular radios, Wi-Fi radios, WiMAX radios, Bluetooth radios etc. The communication subsystem 214 may be connected to one or more antennas 216 for transmitting and receiving signals to and from communication devices. Depending upon the communication type, the communication system may include one or more subscriber identity module (SIM) card 218 to allow communication with a cellular network infrastructure. Although a SIM card 218 is depicted other identifying components including universal subscriber identity modules (USIM), or simply identity modules (IM), or embedded Universal Integrated Circuit Card (eUICC) may be used.

Although illustrative hardware components are depicted in FIG. 2, it will be appreciated that more or fewer components may be provided. For example, the processor 202 may be provided by a single processor as depicted or may comprise multiple processors that are communicatively coupled together, either by a local communication connections or by one or more communication networks. Further, components, or the functionality provided by components, depicted as being provided as part of the hardware may be provided by other separate devices external from the hardware 106 and coupled together by one or more interfaces.

Figure 3:
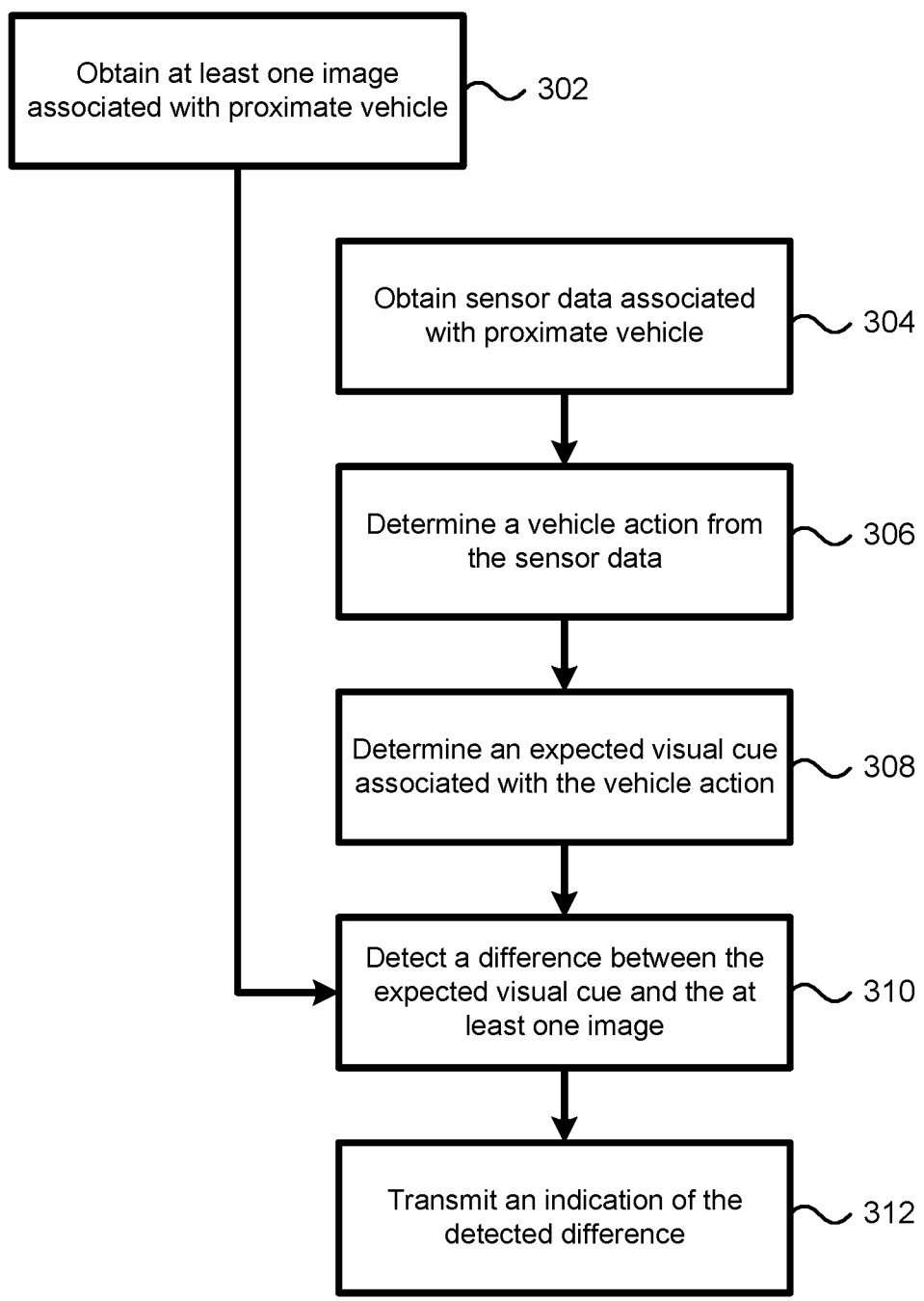
FIG. 3 depicts a method of vehicle differential analysis.

FIG. 3 depicts a method of vehicle differential analysis. The method 300 may be implemented at the vehicle when instructions stored in memory are executed by the processor. The vehicle differential analysis functionality 206 described above may implement the method 300. The method 300 attempts to determine an action of another vehicle and then checks captured images for visual cues associated with the action. In this way, the method 300 can detect differences between an expected behavior and actual behavior detected in captured images. Detected differences can then be communicated to an external system, for example a department of motor vehicles, vehicle manufacture, etc., for possible corrective action. For clarity of the following description, the vehicle performing the method, or at least portions of the method, will be referred to the processing vehicle, and the other vehicle for which an action is determined will be referred to as the proximate vehicle. The method 300 obtains at least one image associated with a proximate vehicle (302). The images may be captured from one or more cameras within, or on, the processing vehicle. The camera or cameras may be provided by one or more forward facing or rear facing cameras or side facing cameras. The cameras may operate individually or may be operated together providing stereoscopic images. The proximate vehicle may be a vehicle that is visible from at least one of the cameras. The proximate vehicle may be directly in front of or behind the processing vehicle, beside the processing vehicle, in front of or behind and in different lanes from the processing vehicle or approaching the processing vehicle from an opposite or different direction. The images may be constantly captured and one or more of the captured images selected for further processing. Alternatively, images may be captured when required by the method, for example when a particular action has occurred. Further, the cameras may maintain a short window of images, for example from between 1-10 seconds, so that previous images are available when an action is detected. This may be useful in correlating certain behaviors that may occur before a detected action, for example a turn signal light may be activated prior to a vehicle turning or changing lanes.

The method 300 obtains sensor data associated with a proximate vehicle (304). The sensor data may be collected from one or more sensors including for example LiDAR sensors, radar sensors, ultrasonic sensors as well as other types of possible sensors. The obtained sensor data may be received directly from the sensors, for example a ranging senor may provide a range measurement to the proximate vehicle. Additionally or alternatively, the obtained sensor data may be obtained from processing of sensor data. For example, image data from a stereoscopic camera system may be processed in order to determine range information to the proximate vehicle. Further still, data from multiple sensors may be fused together to provide a single piece of information. The obtained sensor data is used to determine a vehicle action of the proximate from the sensor data (306). The determination may be based solely on the obtained sensor data, or may additionally be based on further information available at the processing vehicle. For example, in order to determine if the proximate vehicle is braking based on range information, it would also be useful in having information about the processing vehicle's speed. Other additional information that may be used in determining a vehicle action of the proximate vehicle may include GPS positioning information, mapping information steering information, acceleration information, braking information, time of day information, weather conditions. Other information may be used in determining a vehicle action, including for example the type of vehicle such as an emergency vehicle or passenger vehicle, the roadway environment such as during stop and go traffic on a highway or on city streets.

Once a vehicle action is determined, an expected visual cue associated with the determined vehicle action (308). The expected visual cues specify one or more visible behaviors that are associated with the detected behavior in a properly functioning and controlled vehicle. For example, when a vehicle is braking the expected visual cue would be the illumination of all of the brake lights. The expected visual cue may depend upon a number of factors such as the time of day. For example a vehicle that is driving on a road way at night time should have lights on while it may not be necessary during the day. Further, the location of the processing vehicle may be used in determining expected visual cues. For example, in certain jurisdictions, day time running lights are required while in other jurisdictions they are not. Accordingly, the expected visual cue of a vehicle determined to be driving during the day in a jurisdiction requiring daytime running lights may be different from those in jurisdictions that do not require day time running lights. Further, additional information may be used to determine expected visual cues including a type of the proximate vehicle. For example, a passenger vehicle may be expected to have 3 rear brake lights while certain commercial vehicles may not have third brake lights. The above visual cues provide an indication of the visual cues expected in a properly functioning vehicle. In certain scenarios detecting a deviation from the expected may be desired; however, it is also possible to provide expected visual cues that are associated with a malfunctioning or poorly maintained vehicle. Excessive exhaust smoke during idling or acceleration may be a visual cue indicative of a possible maintenance issue. Table 1 below provides a non-exhaustive list of expected visual cues that may be associated with a detected vehicle action. The table also provides illustrative sensor data as well as additional data that may be used in determining the detected action as well as the associated visual cues.

TABLE 1 table of possible detected actions and expected visual cues

| Sensor data of proximate vehicle | Additional data | Detected Action | Expected Visual Cues |
| --- | --- | --- | --- |
| Range decreasing | Processing vehicle's acceleration/deceleration | braking | Brake lights illuminate |
| Range increasing | Processing vehicle's acceleration/deceleration | acceleration | No brake lights |
| Range increasing | Processing vehicle's acceleration/deceleration | acceleration | Excess exhaust smoke |
| Vehicle presence change | Processing vehicle's lane position | lane change | Turn signals illuminate |
| Vehicle moving | Location | driving | Day-time running lights on |
| Vehicle moving | Time of day | driving | Lights on |
| Range decreasing | Processing vehicle's acceleration/deceleration | reversing | Reverse lights illuminated |

TABLE 1-continued table of possible detected actions and expected visual cues

| Sensor data of proximate vehicle | Additional data | Detected Action | Expected Visual Cues |
| --- | --- | --- | --- |

Once one or more expected visual cues have been determined, the obtained images may be used to detected a difference between the expected visual cues and the at least one image (310). For example, image processing techniques may be employed to detected brake lights, turn signal indicators, bright lights etc. Particular processing techniques for identifying the presence or absence of the expected visual cues will be apparent to those of ordinary skill in the art. When a difference is detected between the expected visual cues and the one or more images, an indication of the detected difference may be transmit to a remote location (312). The indication may be a predetermined message sent to a remote computer system and may include information about the detected difference as well as identifying information about the proximate vehicle. The identifying information may be obtained from license plate information of the proximate vehicle. The indication sent to the remote location may be include images of the license plate information, additionally or alternatively, the processing vehicle may perform optical character recognition (OCR) on the license plate image or images and transmit the characters. Further, the indication sent to the remote location may include portions of the data, such as captured images and/or sensor data. As described further below with reference to FIG. 5, the remote location may receive the indication of the detected differences and provide notifications to one or more locations.

Figure 4:
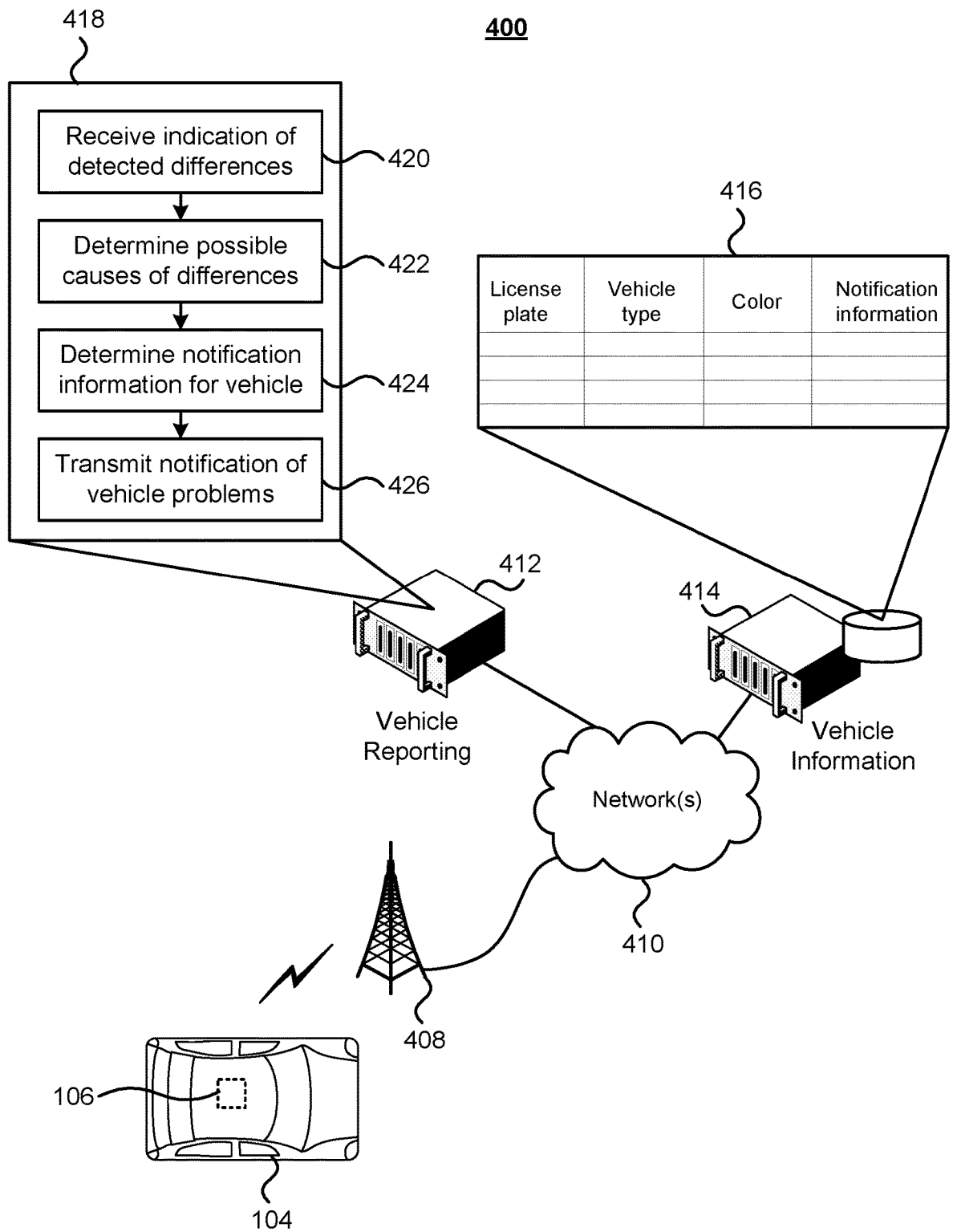
FIG. 4 depicts components of a system for improving vehicle safety using vehicle differential analysis.

FIG. 4 depicts components of a system for improving vehicle safety using vehicle differential analysis. The system 400 may include a plurality of vehicles 104 that include hardware 106 capable of providing vehicle differential analysis functionality as described above. The hardware 106 may communicate via a communication infrastructure, depicted as cellular tower 408 and communication networks 410. The communications may include one or more items, for example, indications of detected differences, images, as well as identifying information of the proximate vehicle and the processing vehicle. The indication may be sent to one or more locations, including, for example a vehicle reporting server 412. The vehicle reporting server 412 may implement notification functionality 418 by executing instructions stored in the server's memory by one or more processors. The notification functionality 418 is depicted as receiving the indication of detected differences 420, which includes vehicle identification information. The notification functionality 418 may determine possible causes of the differences (422). Determining the possible causes may be performed by a look-up to determine possible causes that have been previously associated with the detected differences. Once possible causes are determined, notification information may be determined (424) and the notifications sent to the appropriate locations (426). The notification information may be determined from a vehicle information database or server 414 that stores vehicle identification information (416) including notification information. The stored information may associate a license plate with notification information, such as locations to send notifications to as well as information on types of notifications to provide. Additional identifying information may be associated with the license plate information including, for example vehicle type and color information. In addition to determining notification information associated with the license plate information, additional notification information may be associated with the detected differences or possible causes. For example, if a detected difference is due to a relatively minor problem such as a burnt out brake light, only a vehicle owner may be notified according to the notification information allowing the owner to quickly fix the problem and increase the overall safety of the transportation network. However, if the cause is due to a more serious problem such as a mechanical issue, a $3^{rd}$ party responsible for licensing vehicles may be notified. Additionally, other entities may be notified of issues, such as insurers, financers, dealers, etc.

The system described above has detected differences between expected visual cues associated with a vehicle action and captured images. After detecting possible differences, the vehicle communicates the differences to a remote location. The remote location may send one or more notifications to one or more locations. The notifications may allow corrective actions to be taken in order to improve the safety of vehicles with detected differences. The above system allows autonomous or semi-autonomous vehicles to monitor the operational safety of other vehicles on the roadway, including non-autonomous vehicles. As described further below with reference to FIG. 5, it is possible for the indications of detected differences to be transmitted to the proximate vehicle.

Figure 5:
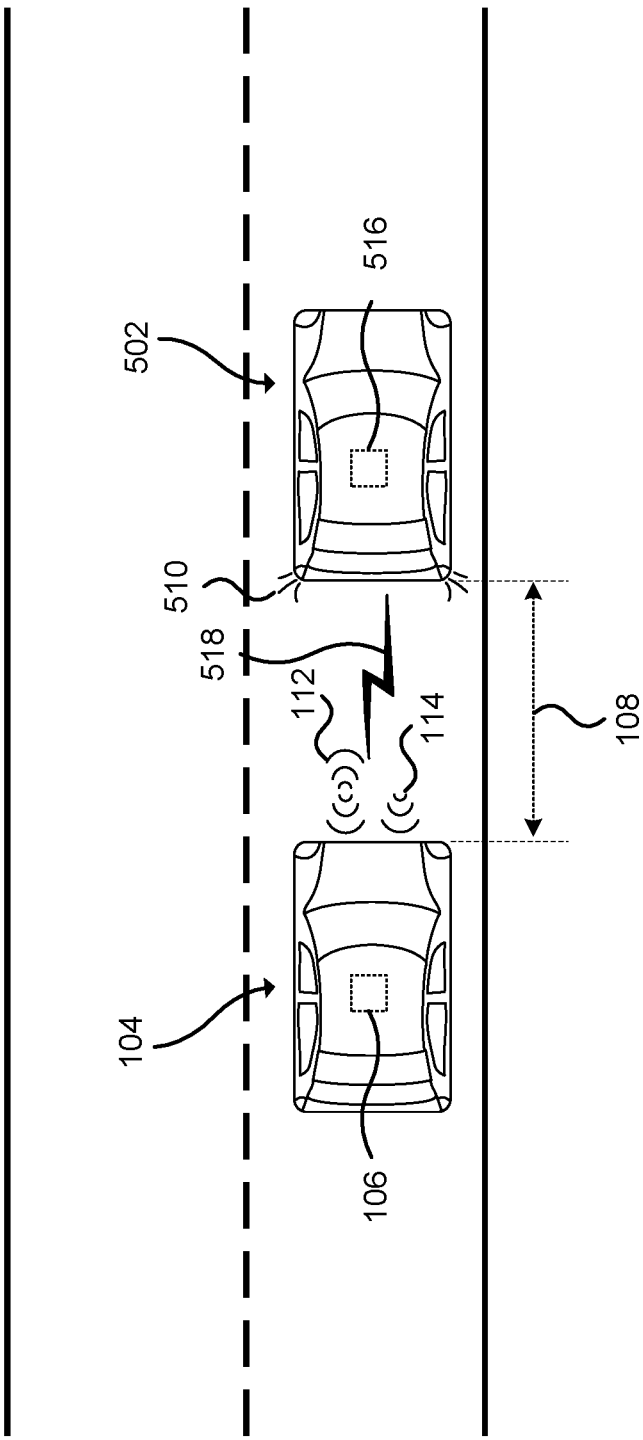
FIG. 5 depicts an additional roadway environment for improving vehicle safety using vehicle differential analysis.

FIG. 5 depicts an additional roadway environment for improving vehicle safety using vehicle differential analysis. The environment 500 is similar to that depicted in FIG. 1 with two vehicles driving on a roadway, however, in contrast to FIG. 1 in which the proximate vehicle 102 was a non-autonomous vehicle the proximate vehicle 502 is a semi-autonomous vehicle, or at least a vehicle having a computing device for communicating with the processing vehicle 104.

The processing vehicle 104 includes hardware 106 capable of providing the vehicle differential analysis functionality. The processing vehicle obtains sensor data such as from radar sensors or LiDAR sensors 512 and captures one or more images, depicted schematically by curved lines 514, of the proximate vehicle 502. The processing vehicle may detect an action of the proximate vehicle 502 from the sensor data. For example, when a range 108 to the vehicle is decreasing, the action may be determined to be braking. Based on the action, an associated visual cue may be determined, such as the brake lights being illuminated 510 which can then be detected in the captured images. When the processing detects a difference between the expected visual cues and the captured images, the processing vehicle may transmit an indication of the detected differences to the proximate vehicle's system 516. The proximate vehicle 502 may receive the indication of the detected vehicle and may take an appropriate action either to take possible corrective actions or provide a notification to the driver of the vehicle or vehicle reporting system as described in FIG. 4.

Various specific details have been described above. While certain features or functionality may be described in particular detail with regard to one device or component, it will be appreciated that the functionality or features may be applied to other devices or components. Further, although various embodiments of the devices, equipment, functionality, etc. are described herein, the description is intended to provide an understanding of the systems, methods and devices and as such certain aspects may not be described, or not described in as much detail as other aspects. The described systems, methods and devices are not the sole possible implementations, and the various descriptions systems, methods and devices herein will enable one of ordinary skill in the art to apply the teachings to other equivalent implementations without exercising any inventive ingenuity.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application.

The invention claimed is:

1. A method for vehicle differential analysis at a computing device in a vehicle, the method comprising:
   obtaining at least one image associated with a proximate vehicle;
   obtaining sensor data associated with the proximate vehicle;
   determining a vehicle action of the proximate vehicle from the sensor data;
   determining an expected visual cue associated with the determined vehicle action;
   detecting a difference between the expected visual cue and the at least one image associated with the proximate vehicle; and
   transmitting an indication of the detected difference through a communications interface to a remote server location on a network.

2. The method of claim 1 further comprising obtaining identification information associated with the proximate vehicle.

3. The method of claim 2 wherein the identification information is obtained from the at least one image from a license plate of the proximate vehicle.

4. The method of claim 3 further comprising using optical character recognition on a license plate to determine a vehicle identification information.

5. The method of claim 4 wherein transmitting the indication of the detected difference through the communications interface to a network includes the identification information.

6. The method of claim 1 further comprising performing an action by the vehicle in response to the detected difference.

7. The method of claim 6, wherein the vehicle is an autonomous vehicle, and the action comprises increasing a following distance to the proximate vehicle.

8. The method of claim 6, wherein the vehicle is an autonomous vehicle, and wherein the action comprises changing lanes.

9. The method of claim 1 wherein the sensor data is provided from one or more of a radar unit, an ultrasonic unit, a LIDAR unit and a camera.

10. The method of claim 1 wherein the expected visual cue is a brake light or a turn signal of the proximate vehicle.

11. The method of claim 1 wherein the image is received from a forward facing camera of the vehicle.

12. A computing device in a vehicle for providing differential analysis, the computing device comprising:
   a processor; and
   a communications subsystem,
   wherein the computing device is configured to:
      obtain at least one image associated with a proximate vehicle;
      obtain sensor data associated with the proximate vehicle;
      determine a vehicle action of the proximate vehicle from the sensor data;
      determine an expected visual cue associated with the determined vehicle action;
      detect a difference between the expected visual cue and the at least one image associated with the proximate vehicle; and
      transmit an indication of the detected difference through a communications subsystem to a remote server location on a network.

13. The computing device of claim 12, wherein the computing device is further configured to obtain identification information associated with the proximate vehicle.

14. The computing device of claim 13, wherein the identification information is obtained from the at least one image from a license plate of the proximate vehicle.

15. The computing device of claim 12, wherein the computing device is further configured use optical character recognition on a license plate to determine a vehicle identification information.

16. The computing device of claim 15, wherein transmitting the indication of the detected difference through the communications interface to a network includes the identification information.

17. The computing device of claim 12, wherein the computing device is further configured perform an action by the vehicle in response to the detected difference.

18. The computing device of claim 17, wherein the vehicle is an autonomous vehicle, and the action comprises increasing a following distance to the proximate vehicle.

19. The computing device of claim 17, wherein the vehicle is an autonomous vehicle, and wherein the action comprises changing lanes.

20. The computing device of claim 12, wherein the sensor data is provided from one or more of a radar unit, an ultrasonic unit, a LIDAR unit and a camera.

21. The computing device of claim 12, wherein the expected visual cue is a brake light or a turn signal of the proximate vehicle.

22. The computing device of claim 12, wherein the image is received from a forward facing camera of the vehicle.

* * * * *